United States Patent [19]

Leonov et al.

[11] 4,401,019
[45] Aug. 30, 1983

[54] APPARATUS FOR THERMOCHEMICAL TREATMENT OF CRUSHED STRAW AND OR DRY FODDER MIXTURES

[76] Inventors: Alexandr Y. Leonov, ulitsa Pushkina, 7, kv. 29; Georgy G. Matveev, ulitsa Novobulvarnaya, 121, kv. 14; Leonid V. Morozov, ulitsa Promyshlennaya, 51-a, kv. 10; Vladimir A. Bobovsky, Moskovsky trakt, 59, kv. 2, all of Chita, U.S.S.R.

[21] Appl. No.: 201,596

[22] Filed: Oct. 29, 1980

Related U.S. Application Data

[63] Continuation of Ser. No. 930,853, Aug. 3, 1978, abandoned.

[51] Int. Cl.³ .............................................. A23K 1/00
[52] U.S. Cl. ..................................... 99/471; 99/474; 99/475; 99/483; 99/516; 426/511; 426/623
[58] Field of Search ........................... 99/471, 473–475, 99/483, 516, 646 S, 534, 536; 366/106, 107, 189, 192; 426/507, 511, 630, 623

[56] References Cited

U.S. PATENT DOCUMENTS

| | | | |
|---|---|---|---|
| 890,644 | 6/1908 | Harvey et al. | 99/471 |
| 1,061,933 | 5/1913 | Willford | 426/507 |
| 1,574,210 | 2/1926 | Spaulding | 426/507 |
| 2,086,338 | 7/1937 | Sodergreen | 426/511 |
| 2,227,634 | 1/1941 | Dalin | 426/507 |
| 2,295,740 | 9/1942 | Keen | 366/107 |
| 3,108,530 | 10/1963 | Zies | 99/536 |
| 3,684,526 | 8/1972 | Lowery | 99/471 |
| 3,697,286 | 10/1972 | Grun | 99/471 |
| 4,078,480 | 3/1978 | Luck | 99/516 |

Primary Examiner—Philip R. Coe
Assistant Examiner—Timothy F. Simone
Attorney, Agent, or Firm—McAuley, Fields, Fisher, Goldstein & Nissen

[57] ABSTRACT

An apparatus for thermochemical treatment of crushed straw and/or dry fodder mixtures comprises a vessel which is vertically mounted and is formed by a series of vertically communicating chambers. A chamber arranged at the top of the vessel is a cyclone-type chamber, is designed for moistening and pre-heating of crushed straw and dry fodder mixture and has a loading opening. A second chamber is arranged under the cyclone-type chamber, is designed for thermochemical treatment of straw and dry fodder mixtures and has a heat distributor communicating by means of a pipeline with a heat carrier source. A third chamber is arranged under the chamber for thermochemical treatment and is an accumulating chamber having an unloading opening. This construction of the apparatus enables the elimination of the step of stirring of straw, considerably simplifies the operation, improves the output and reduces the time for processing of straw and dry fodder mixtures.

11 Claims, 4 Drawing Figures

APPARATUS FOR THERMOCHEMICAL TREATMENT OF CRUSHED STRAW AND OR DRY FODDER MIXTURES

This is a continuation of application Ser. No. 930,853 filed Aug. 3, 1978, abandoned.

FIELD OF THE INVENTION

The present invention relates to agricultural production, and more particularly to apparatus for thermochemical treatment of crushed straw and or dry fodder mixtures used in animal breeding farms.

BACKGROUND OF THE INVENTION

An apparatus for thermochemical treatment of crushed straw and dry fodder mixtures is known comprising a vessel provided with loading and unloading openings and pipes for feeding steam and chemical solutions. In such apparatus the vessel comprises a horizontally extending cylindrical casing rotatable about a horizontal axis. For that purpose, the vessel is provided with rolls accommodated in guides embracing the vessel. The vessel is rotated by a drive after a pre-set quantity of straw or dry fodder mixture or both is loaded therein and steam and chemical solutions are fed to the vessel.

Also known are other apparatus in which vessels are stationary and provided with stirrers. The stirrer starts operating only after a pre-set quantity of e.g. crushed straw is loaded into the vessel. However, in the above-described and other apparatus, thermochemical treatment is conducted with large volumes and during a long time period. In addition, much time is spent loading and unloading the vessels thus considerably reducing the output of the apparatus.

The large size of such apparatus requires much metal for construction, they occupy large areas, are complicated in operation and require a large operating staff.

BRIEF DESCRIPTION OF THE INVENTION

It is an object of the invention to provide an apparatus for thermochemical treatment of crushed straw and or dry fodder mixtures which enables a reduction of the production time for processing such fodders.

Another object of the invention is to provide an apparatus for thermochemical treatment of crushed straw and or dry fodder mixtures which improves the productivity.

With these and other objects in view, in an apparatus for thermochemical treatment of crushed straw and or dry fodder mixtures comprising a vessel having loading and unloading openings and pipes for feeding steam and chemical solutions, according to the invention, the vessel is mounted in a vertical position and is formed by a series of vertically communicating devices including a cyclone-type chamber for moistening and pre-heating of crushed straw and dry fodder mixtures having a loading opening and pipes for admission of steam and chemical solutions, a chamber for thermochemical treatment of straw and dry fodder mixtures which is arranged under the cyclone-type chamber and has a heat distributor communicating with a heat carrier source by means of a pipeline, and an accumulating chamber arranged under the chamber for thermochemical treatment and having an unloading opening. The vessel which is so constructed permits the treatment of straw (crushed straw or dry fodder mixtures or both) with steam and chemical solutions during its feeding as early as in the top part of the vessel, that is in the cyclone-type chamber, the moistened straw being thermochemically treated during its movement from top down in the underlying chamber and is appropriately conditioned during accumulation in the lower part of the vessel. Moistening and thermochemical treatment of straw (fodder) take place during its feeding to and movement within the vessel and thus eliminate the step of stirring, thereby materially simplifying the apparatus and its maintenance, considerably improving the output and reducing the processing time.

The invention is further characterized in that the pipes for feeding steam and chemical solutions are provided with atomizing nozzles mounted in the cyclone-type chamber and positioned in such a manner that steam is admitted to the chamber in the direction of flow of straw and dry fodder mixtures and chemical solution is admitted both in co- and counter-current with the flow thereof. This reduces the consumption of chemical solutions due to fine atomization thereof and uniform action on the straw fed to the vessel.

The accumulating chamber preferably communicates with atmosphere by means of an exhaust pipe so that gases released during the treatment of straw are removed from the chamber thereby improving the palatability of the straw.

The accumulating chamber is preferably made with a diameter which is slightly greater than the diameter of the chamber for thermochemical treatment so as to provide a sufficient space for accumulation of straw and create the conditions for further treatment of straw during accumulation.

The invention is further characterized in that the bottom wall of the accumulating chamber is rotatable to provide the loading opening and has a drain pipe and a counterweight which holds the bottom wall in the position in which it closes the unloading opening during accumulation of straw and dry fodder mixtures in the chamber so as to eliminate manual unloading thereof from the vessel and to remove excessive moisture.

The invention is also characterized in that the heat distributor is formed by a set of plates shaped as truncated cones each having an opening in the smaller base surface, which are superposed on one another axially along the chamber and spaced from one another, the openings of the smaller base surfaces of the plates defining a passage. This creates the conditions for uniform treatment of moving straw.

In accordance with one embodiment of the heat distributor, the plates thereof are positioned with their smaller base surfaces facing the cyclone-type chamber, the pipeline from the heat carrier source being received in the passage defined by the openings.

In accordance with another embodiment of the heat distributor, the plates thereof are positioned with their smaller base surfaces facing the accumulating chamber, the pipeline from the heat carrier source extending in the space between the casing of the chamber for thermochemical treatment and the plates and comprising a ring having apertures for the passage of heat carrier.

Therefore, the apparatus for thermochemical treatment of crushed straw and dry fodder mixtures according to the invention is compact, simple in manufacture and operation, has high output and ensures the production of fodder, such as crushed straw of a desired grade.

BRIEF DESCRIPTION OF THE DRAWINGS

The apparatus for thermochemical treatment of crushed straw or dry fodder mixtures according to the invention will now be described in detail with reference to the accompanying drawings, in which.

DETAILED DESCRIPTION OF THE INVENTION

Figure 1:
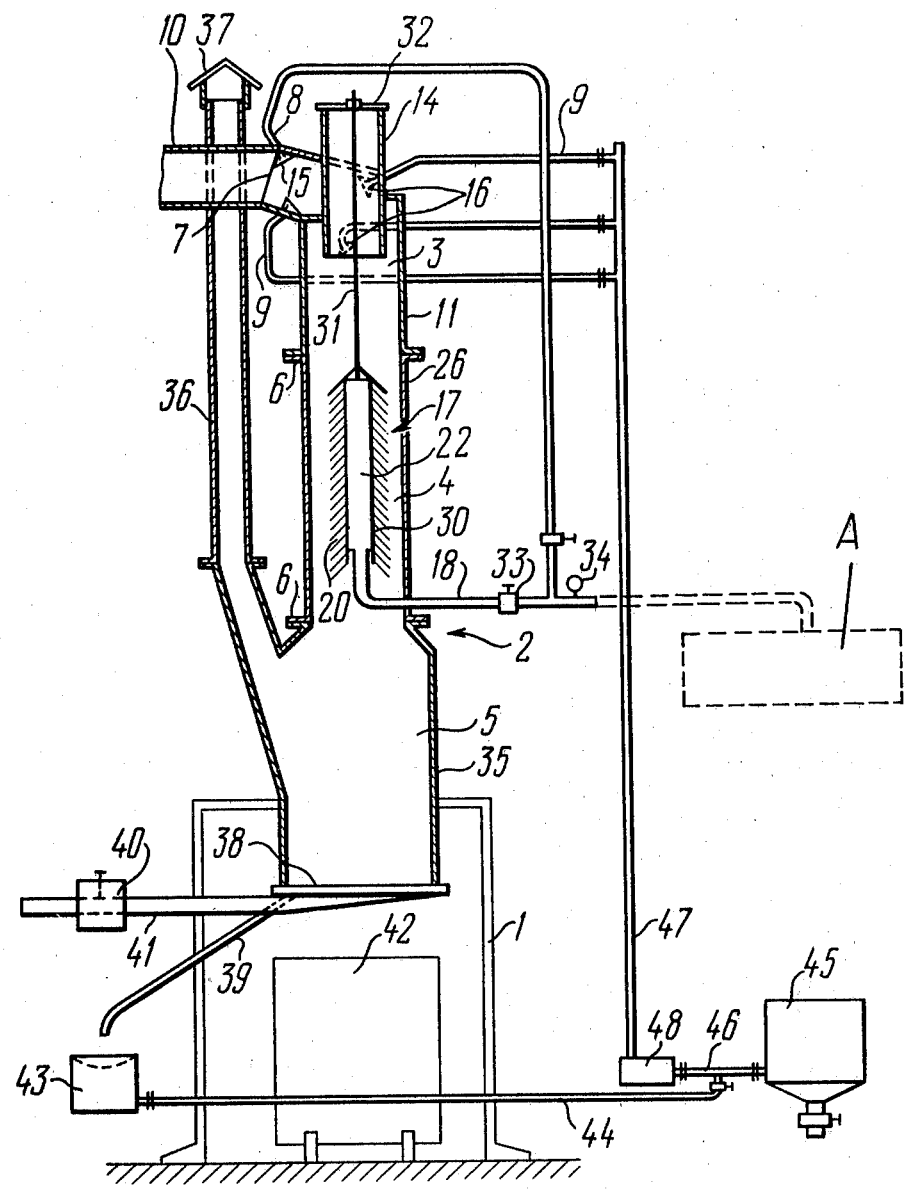
FIG. 1 schematically shows a general view, partially in section, of the apparatus according to the invention.
Figure 2:
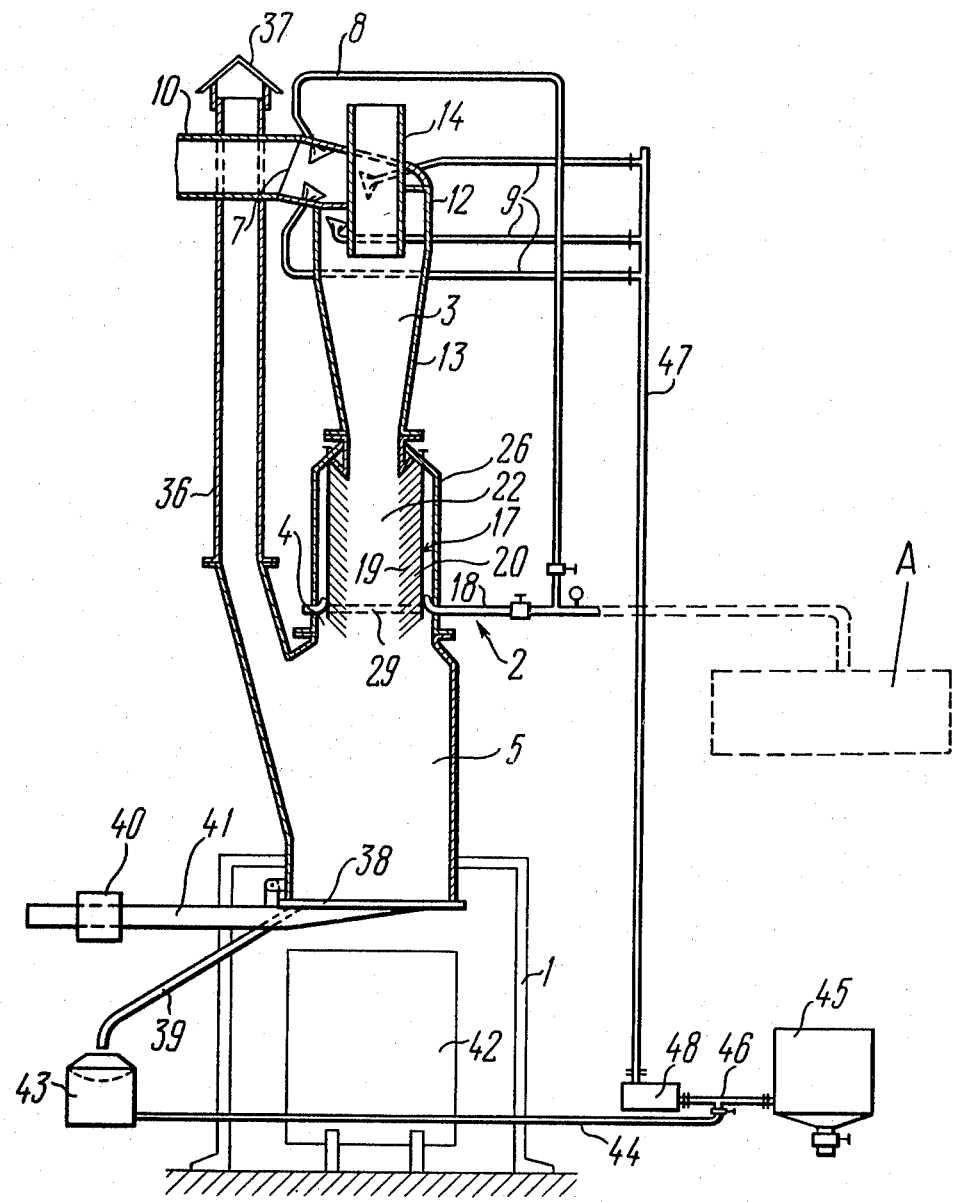
FIG. 2 schematically shows a general view, partially in section, of the apparatus according to the invention having a different shape of the vessel chambers and a heat distributor.

The apparatus for thermochemical treatment of crushed straw and/or dry fodder mixtures according to the invention is shown in FIGS. 1 and 2; the crushed straw, dry fodder mixtures or both in combination will be hereinafter referred to as fodder. The apparatus comprises a frame 1 supporting a vertically extending vessel 2 which is formed by a series of three vertically communicating devices including a cyclone-type chamber 3, a chamber 4 for thermochemical treatment of fodder and an accumulating chamber 5.

To facilitate the assembly, the casing of each chamber has flanges 6 which are bolted together (not shown).

The cyclone-type chamber 3 is arranged in the top part of the vessel 2 and is designed for moistening and pre-heating of fodder. The chamber 3 has a loading opening 7, and pipes 8 for feeding steam and 9 for feeding chemical solutions. The loading opening 7 is designed for feeding fodder to the chamber and respectively to the vessel, the loading opening having a pipe 10 which is sealingly connected to the casing of the chamber 3. The pipe 10 incorporates any appropriate known device (such as a blower) for creation of a gauge pressure of air to ensure the transfer of fodder along the pipe 10.

It is obvious that the cyclone-type chamber 3, as all known cyclone chambers, may be made in the form of a cylindrical casing 11 as shown in FIG. 1 or in the form of cylindrical and conical casings 12, 13 (FIG. 2), the conical part of the casing being arranged under the cylindrical part 12 thus accelerating the flow of fodder from the chamber 3 into the chamber 4 for thermochemical treatment, a pipe 14 being provided in the top part of the cyclone-type chamber 3 to connect the chamber 3 with the atmosphere thus removing an excess of air fed to the chamber 3 together with the fodder from the chamber, as well as all collateral gases released under the action of steam and chemical solutions on the fodder. The loading opening 7 of the chamber 3 is provided in a side wall of the casing thereof so that during the admission of fodder and air under pressure, a swirling flow is created in the chamber 3 so that the fodder progressively moves down to the chamber 4 for thermochemical treatment, and an excess of air is discharged through the pipe 14.

The steam feeding pipes 8 are provided with atomizing nozzles 15 which are mounted in the cyclone-type chamber 3 and positioned in such a manner that steam is admitted to the chamber in the direction of fodder flow, that is the heads of the atomizing nozzles 15 are oriented in one and the same direction.

The pipes 9 for feeding chemical solutions are provided with atomizing nozzles 16 mounted in the cyclone-type chamber 3 and positioned in such a manner that a chemical solution is fed both in co- and counter-current with the flow of the fodder, that is the heads of the atomizing nozzles are oriented in opposite directions. The atomizing nozzles 15 and 16 are not disclosed in detail in the specification and drawings since any known devices appropriate for this purpose may be used.

The chamber 4 for thermochemical treatment is provided with a heat distributor 17 communicating by means of a pipeline 18 with a source of a heat carrier, such as steam (A).

Figure 3:
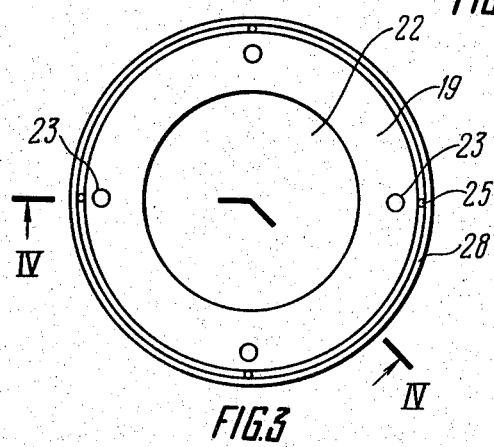
FIG. 3 is a plan view of the heat distributor.

The heat distributor 17 is formed by a set of plates 19 (FIG. 3) shaped as truncated cones. The plates 19 (FIG. 4) are superposed on one another axially along the chamber 4 and spaced from one another with a space 20 therebetween. The smaller base surface of each plate 19 has an opening 21 so that when the plates are superposed on one another the openings 21 of the smaller base surfaces define a passage 22 (FIG. 3).

Figure 4:
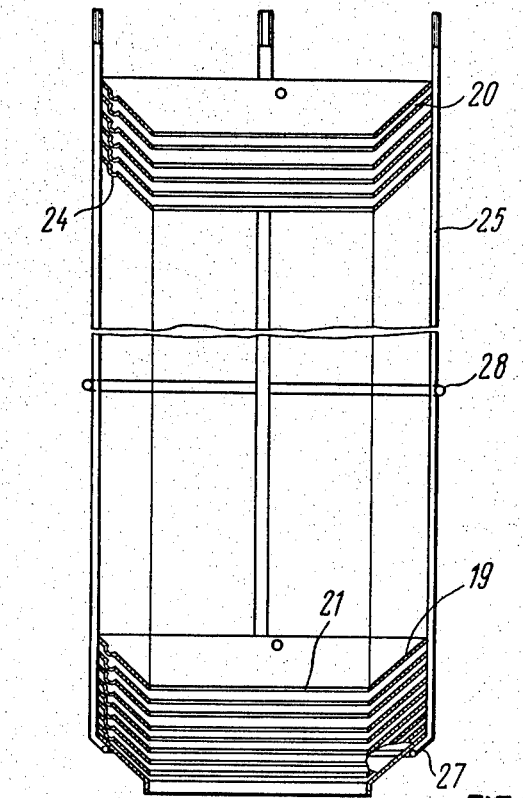
FIG. 4 is a sectional view taken along the line IV—IV in FIG. 3.

To provide the spaces 20, each plate 19 has four diametrically opposed recesses 23 which form projections 24 (FIG. 4) at the other side of the plate. The plates bear against one another through the projections 24 as shown in FIG. 4.

The set of plates 19 is held by rods 25 located outside the plates. The rods 25 are secured with their upper ends to a casing 26 of the chamber 4 for thermochemical treatment (FIG. 2) in any known manner, such as by bolts. The lower ends of the rods 25 (FIG. 4) have bent portions 27 defining a support for the plates. All rods 25 are embraced by a ring 28 holding the rods against displacement. A similar ring embraces the bent portions of the rods.

The plates 19 of the heat distributor 17 may be arranged in a different manner; thus the heat distributor 17 shown in FIG. 2 has the plates 19 which face the accumulating chamber 5 with their smaller base surfaces. In this case the pipeline 18 from a heat carrier source is arranged in the space between the casing 26 of the chamber 4 and the plates 19 and comprises a ring 29 embracing the heat distributor 17 and having apertures (not shown) for the passage of a heat carrier.

In the heat distributor 17 shown in FIG. 1, the plates 19 face the cyclone-type chamber 3 with their smaller base surfaces, the plates 19 being held by rods 30 extending through the passage 22 formed by the openings 21 of the plates. The upper ends of the rods 30 are rigidly secured to a bar 31 extending axially of the vessel and through the cyclone-type chamber 3 and the pipe 14 thereof. The end of the bar 31 is secured by any known manner to a cross-bar 32 mounted on the pipes 14 as shown in FIG. 1. With such construction of the heat distributor 17, the pipeline from the heat carrier source is received in the passage 22. Since steam is used as heat carrier, the pipeline 18 communicates with the pipe 8 to simplify the piping, a control valve 33 and a pressure gauge 34 being built in the pipeline 18.

The accumulating chamber 5 is mounted under the chamber 4 for thermochemical treatment and is made with a diameter which is slightly greater than the diameter of the chamber 4 so that a pre-set volume of fodder can be accumulated in the vessel. An exhaust pipe 36 is mounted in a casing 35 of the chamber 5 to connect the chamber 5 to atmosphere. A metal umbrella 37 is mounted over the open end of the exhaust pipe 36.

The bottom wall 38 of the accumulating chamber 5 is rotatable to provide the unloading opening. As a result, the size of the opening corresponds to the cross-sectional size of the accumulating chamber 5 thus contributing to a rapid unloading of fodder therefrom. The rotation of the bottom wall 38 is achieved by appropriately fixing it to the casing 35 by any known manner.

The bottom wall 38 is provided with a drain pipe 39 through which excessive moisture is removed from the fodder during its accumulation, and a counter-weight 40 is mounted on an arm 41 secured to the bottom wall. The counter-weight 40 holds the bottom wall in the position closing the unloading opening during accumulation of fodder in the accumulating chamber 5 and ensures an automatic pivoting of the bottom wall for discharging the fodder into trolleys 42 arranged under the accumulating chamber when the weight of the fodder in the chamber corresponds to that of the counter-weight.

A tank 43 having a filter screen is mounted under the drain pipe 39 and is connected by means of a conduit 44 to a receptacle 45 for chemical solution. The tank 45 communicates with the pipes 9, via pipelines 46, 47 and a pump 48.

The apparatus according to the invention functions in the following manner.

A fodder, such as crushed straw is fed by means of a blower along the pipe 10 to the cyclone-type chamber 3. During the admission, the fodder is pre-heated in the chamber 3 with live steam and moistened with a chemical solution which are fed through the atomizing nozzles 15 and 16 of the pipes 8 and 9, respectively. Chemical solutions include known chemical solutions which are used by those skilled in the art for treatment of crushed straw and dry fodder mixtures.

Since the atomizing nozzles 15 are oriented in the direction of the fodder flow, and the atomizing nozzles 16 are oriented both in co- and counter-current with the fodder flow, the conditions are provided in the cyclone-type chamber 3 under which the fodder is rapidly moistened and heated as it is admitted to the chamber.

The heated and moistened fodder moves in a swirling stream downwards to the chamber 4 for thermochemical treatment, and an excess of air is removed from the chamber 3 through the pipe 14. As shown in FIG. 1, the fodder flows in the chamber 4 for thermochemical treatment in the space between the casing 26 of the chamber 4 and the heat distributor 17, and as shown in FIG. 2, the fodder moves through the passage 22 of the heat distributor 17. During this movement, the fodder is treated with the steam fed through the spaces 20 of the heat distributor 17. After the thermochemical treatment the fodder flows from the chamber 4 for thermochemical treatment to the accumulating chamber 5 wherein, after the weight of the fodder in the chamber attains a pre-set value, the bottom wall 38 rotates and all fodder is discharged through the opening thus formed into the trolley 42. Noxious gases released during the thermochemical treatment, as well as a part of the excess air are removed into the atmosphere through the exhaust pipe 36. A small excess quantity of solution (indicative of complete saturation of fodder) is removed through the drain pipe 39 to the tank 43 and then to the receptacle 45. The solution is fed from the receptacle 45 by any known pump 48 via the pipelines 46 and 47 and pipes 9 to the atomizing nozzles 16.

What is claimed is:

1. An apparatus for thermochemical treatment of crushed straw or dry fodder mixtures comprising:
   in combination:
   a vertical vessel formed of three vertically communicating chambers including:
   a first cyclone-type chamber for moistening and preheating of said mixtures and having a loading opening in the upper part thereof;
   first means for feeding crushed straw and dry fodder mixtures under pressure through said loading opening, said first feeding means contributing to the creation of a swirling flow in said cyclone-type chamber;
   second means for feeding steam to the upper part of said cyclone-type chamber, said second means being provided with atomizing nozzles extending into said cyclone-type chamber and oriented so that steam is supplied in the direction of flow of said crushed straw and dry fodder mixtures;
   third means for feeding chemical solutions to the upper part of said cyclone-type chamber, said means for supplying chemical solutions having atomizing nozzles extending into said cyclone-type chamber and oriented so that a chemical solution is supplied both in co- and counter-current with the flow of the crushed straw and dry fodder mixtures;
   a second chamber for thermochemical treatment of crushed straw and dry fodder mixtures and arranged under said cyclone-type chamber;
   a heat distributor in said second chamber for thermochemical treatment and comprising a plurality of plates shaped as truncated cones each having a larger base and smaller base;
   an opening made in the smaller base;
   said plates being superposed on one another axially along said second chamber with spaces therebetween;
   said openings in the smaller bases of the plates defining a passage for the descent of said mixtures;
   means for conveying heat from a heat source to said distributor; and
   a third, accumulating, chamber below said second chamber and having a diameter slightly larger than the diameter of said chamber for thermochemical treatment and, a rotatable bottom wall to provide an unloading opening in said accumulating chamber.

2. The apparatus of claim 1, wherein:
   said heat distributor comprises:
   a set of plates shaped as truncated cones superposed on one another axially along said second chamber with spaces therebetween, the edges of said smaller base of said plates facing said cyclone-type chamber and defining a vertical passage;
   said means for feeding steam extending into the lower extremity of said passage; and
   a cover over the upper extremity of said passage to prevent straw or fodder from entering said passage, the edges of said larger base of said plates being spaced from the sides of said second chamber so to provide an unobstructed vertical passage for descent of the preheated and chemically treated straw of fodder from said cyclone-type chamber to said accumulating chamber while being further heated by means of heat issuing from spaces between said plates; and said spaces being formed by projections on said plates, said plates bearing against one another through said projections.

3. The apparatus according to claim 2, further including
a drain pipe in said rotatable bottom wall for removal of excessive moisture from the crushed straw and dry fodder mixtures accumulated in said accumulating chamber; and
a counter-weight for holding said bottom wall in the position in which it closes the unloading opening during accumulation of straw and dry fodder mixtures in said accumulating chamber until the weight of the straw and fodder corresponds to the weight of the counterweight and causes said wall to rotate to discharge said mixtures.

4. The apparatus of claim 2, further including pipe means communicating with said cyclone-type chamber to remove excess air therefrom.

5. The apparatus of claim 2, further including exhaust means communicating with said accumulating chamber to exhaust noxious gases and excess air therefrom.

6. The apparatus according to claim 1, further including a drain pipe in said rotatable bottom wall for removal of excessive moisture from the crushed straw and dry fodder mixtures accumulated in said accumulating chamber; and
a counter-weight for holding said bottom wall in the position in which it closes the unloading opening during accumulation of straw and dry fodder mixtures in said accumulating chamber until the weight of the straw and fodder corresponds to the weight of the counterweight and causes said wall to rotate to discharge said mixtures.

7. The apparatus of claim 6, further including pipe means communicating with said cyclone-type chamber to remove excess air therefrom.

8. The apparatus of claim 6, further including exhaust means communicating with said accumulating chamber to exhaust noxious gases and excess air therefrom.

9. The apparatus of claim 1, further including pipe means communicating with said cyclone-type chamber to remove excess air therefrom.

10. The apparatus of claim 9, further including exhaust means communicating with said accumulating chamber to exhaust noxious gases and excess air therefrom.

11. The apparatus of claim 1, further including exhaust means communicating with said accumulating chamber to exhaust noxious gases and excess air therefrom.

* * * * *